United States Patent
Katsu

(10) Patent No.: US 8,093,170 B2
(45) Date of Patent: Jan. 10, 2012

(54) SEMICONDUCTOR CERAMIC MATERIAL

(75) Inventor: Hayato Katsu, Juelich (DE)

(73) Assignee: Murata Manufacturing Co., Ltd., Nagokakyo-Shi, Kyoto-fu (JP)

( * ) Notice: Subject to any disclaimer, the term of this patent is extended or adjusted under 35 U.S.C. 154(b) by 0 days.

(21) Appl. No.: 12/636,372

(22) Filed: Dec. 11, 2009

(65) Prior Publication Data

US 2010/0084619 A1    Apr. 8, 2010

Related U.S. Application Data

(63) Continuation of application No. PCT/JP2008/060424, filed on Jun. 6, 2008.

(30) Foreign Application Priority Data

Jun. 14, 2007 (JP) ................................. 2007-157420

(51) Int. Cl.
    *C04B 35/00*    (2006.01)
(52) U.S. Cl. ........ 501/134; 501/123; 501/126; 501/135; 501/136; 501/137; 252/519.12; 252/519.13; 252/520.2; 252/521.1
(58) Field of Classification Search .................. 501/136, 501/123, 126, 134, 135, 137; 252/519.12, 252/520.21
See application file for complete search history.

(56) References Cited

U.S. PATENT DOCUMENTS

| | | | |
|---|---|---|---|
| 4,956,320 A * | 9/1990 | Asakura et al. | ................ 501/137 |
| 2008/0286185 A1 | 11/2008 | Shimada et al. | |
| 2009/0201121 A1 | 8/2009 | Katsu et al. | |

FOREIGN PATENT DOCUMENTS

| | | | |
|---|---|---|---|
| JP | 55-95673 | | 7/1980 |
| JP | 56-169301 A | | 12/1981 |
| JP | 57-223 | | 1/1982 |
| JP | 2-192456 A | | 7/1990 |
| JP | 6-302402 A | | 10/1994 |
| JP | 10-70007 | | 3/1998 |
| JP | 2005-255493 A | | 9/2005 |
| JP | 2005255493 A | * | 9/2005 |
| JP | 2006-265062 | * | 10/2006 |
| JP | 2007-1821 | | 1/2007 |
| WO | WO-2006/106910 A1 | | 10/2006 |
| WO | WO-2008/038538 A1 | | 4/2008 |

OTHER PUBLICATIONS

Machine translation of JP2005-255493.*
Machine Translation of JP 2006-265062.*
PCT Written Opinion.

* cited by examiner

*Primary Examiner* — Mark Kopec
*Assistant Examiner* — Haidung Nguyen
(74) *Attorney, Agent, or Firm* — Dickstein Shapiro LLP

(57) ABSTRACT

A semiconductor ceramic material which contains no Pb and has a high Curie point, low resistivity, and PTC characteristics is represented by the formula $ABO_3$ wherein A includes Ba, Ca, an alkali metal element, Bi, and a rare-earth element, and B includes Ti. The semiconductor ceramic material contains 5 to 20 molar parts and preferably 12.5 to 17.5 molar parts of Ca per 100 molar parts of Ti. The ratio of the content of the alkali metal element to the sum of the content of the bismuth plus the content of the rare earth element, is preferably from 1.00 to 1.06. The semiconductor ceramic material preferably further contains 0.01 to 0.2 molar parts of Mn per 100 molar parts of Ti.

14 Claims, 2 Drawing Sheets

Ca CONTENT: 0 MOLAR PART

Ca CONTENT: 5 MOLAR PARTS

Ca CONTENT: 20 MOLAR PARTS

Ca CONTENT: 25 MOLAR PARTS

SEMICONDUCTOR CERAMIC MATERIAL

This is a continuation of application Ser. No. PCT/JP2008/060424, filed Jun. 6, 2008, which is hereby incorporated herein by reference.

TECHNICAL FIELD

The present invention relates to a semiconductor ceramic material having PTC characteristics.

BACKGROUND ART

Semiconductor ceramic materials for use in positive temperature coefficient thermistors have PTC characteristics such that the resistances thereof sharply increase when the semiconductor ceramic materials are heated to predetermined temperatures (Curie points). Known examples of such semiconductor ceramic materials having PTC characteristics include $BaTiO_3$ materials.

The semiconductor ceramic materials need to be usable at elevated temperatures for applications such as thermistors for heaters. The following material is known: a $(Ba, Pb)TiO_3$ semiconductor ceramic material, prepared by partly replacing Ba in $BaTiO_3$ with Pb, having a high Curie point.

However, there is a problem in that a material of which the Curie point is increased by the addition of Pb as described above has a small temperature coefficient of resistance and the temperature coefficient of resistance thereof is voltage-dependent, as described in Japanese Unexamined Patent Application Publication No. 56-169301 (Patent Document 1). Therefore, a semiconductor ceramic material which contains no Pb, which has a high Curie point, and which is suitable for use in positive temperature coefficient thermistors is desired.

For example, Patent Document 1 and Japanese Unexamined Patent Application Publication No. 2005-255493 (Patent Document 2) disclose a $(Ba, Na, Bi, Ln)TiO_3$ semiconductor ceramic material (Ln is a rare-earth element) for use in positive temperature coefficient thermistors.

However, an increase in Curie point tends to cause an increase in electrical resistivity. Therefore, compositions disclosed in Patent Document 1 or 2 have a Curie point of 120° C. or higher and an electrical resistivity of about 70 Ω·cm, which is relatively large. Therefore, compositions having lower resistivity are desired for use in thermistors for heaters.
Patent Document 1: Japanese Unexamined Patent Application Publication No. 56-169301
Patent Document 2: Japanese Unexamined Patent Application Publication No. 2005-255493

DISCLOSURE OF INVENTION

Problems to be Solved by the Invention

It is one object of the present invention to provide a semiconductor ceramic material which contains no Pb and which has a high Curie point, low electrical resistivity, and PTC characteristics.

Means for Solving the Problems

The present invention relates to a semiconductor ceramic material which is represented by the formula $ABO_3$ and which has PTC characteristics, wherein A includes Ba, Ca, an alkali metal element, Bi, and a rare-earth element, and B includes Ti. The semiconductor ceramic material contains 5 to 20 molar parts of Ca per 100 molar parts of Ti.

The content of Ca is preferably 12.5 to 17.5 molar parts per 100 molar parts of Ti.

The content of the alkali metal element, the content of Bi, and the content of the rare-earth element are preferably selected such that the ratio of the content of the alkali metal element to the sum of the content of the bismuth plus the content of the rare earth element is from 1.00 to 1.06.

The semiconductor ceramic material according to the present invention preferably further contains 0.01 to 0.2 molar parts of Mn per 100 molar parts of Ti.

Advantages

In a semiconductor ceramic material according to the present invention, the A-site (Ba site) is partly occupied with Ca such that the content of Ca is 5 to 20 molar parts of Ca per 100 molar parts of Ti; hence, the electrical resistivity thereof can be reduced while the Curie point thereof is kept high. Therefore, if the semiconductor ceramic material according to the present invention is applied to a positive temperature coefficient thermistor, a large current can be supplied through the thermistor and therefore a high-power PTC heater can be obtained.

If the content of Ca is selected within a limited range from 12.5 to 17.5 molar parts per 100 molar parts of Ti, the electrical resistivity can be further reduced.

If the ratio of the content of the alkali metal element to the sum of the content of the bismuth plus the content of the rare earth element, is from 1.00 to 1.06, a good carrier balance and high rate of change in resistance can be obtained and PTC characteristics can be improved.

When the semiconductor ceramic material according to the present invention further contains 0.01 to 0.2 molar parts of Mn, which serves as an acceptor, per 100 molar parts of Ti, acceptor can be present at grain boundaries, the rate of change in resistance can be enhanced, and PTC characteristics can be further improved.

BEST MODES FOR CARRYING OUT THE INVENTION

Figure 1:
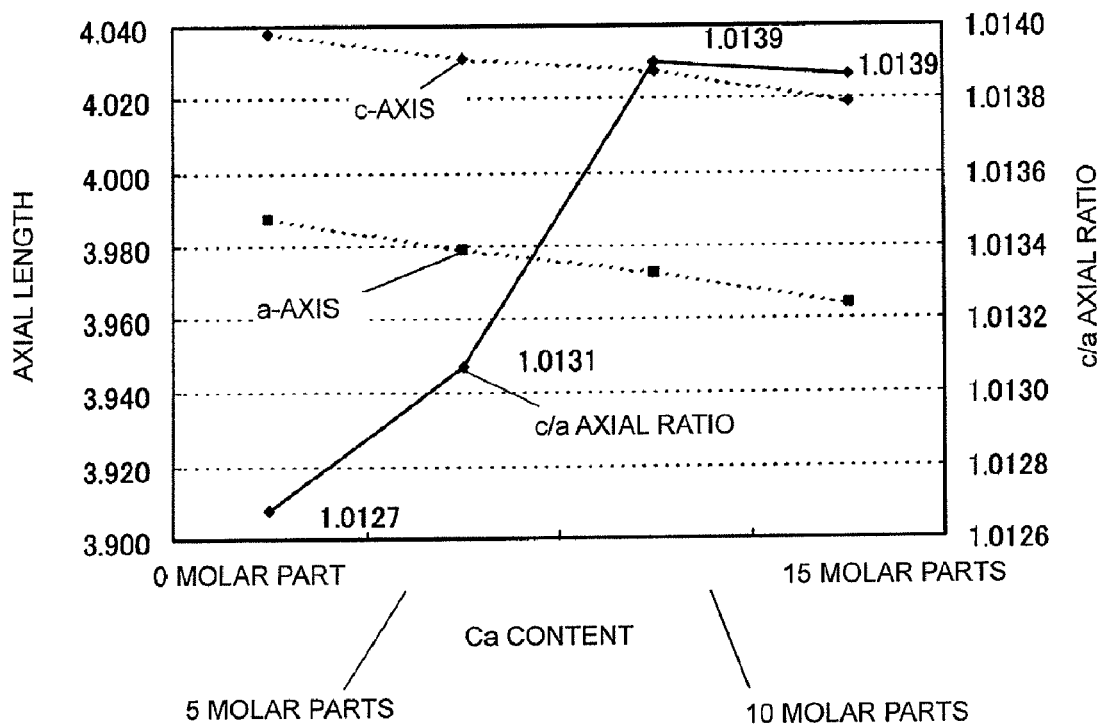
FIG. 1 is a graph showing the relationship between the content of Ca in a ceramic crystal in each evaluation sample prepared in Example 1, the length of the a-axis and c-axis of the ceramic crystal, and the axial ratio (c/a axial ratio) of the ceramic crystal, the a-axis and c-axis thereof being determined by X-ray diffraction.

A semiconductor ceramic material having PTC characteristics according to the present invention has a composition represented by the formula $ABO_3$. In the formula $ABO_3$, A includes Ba, Ca, an alkali metal element (such as Na, K, or Li), Bi, and a rare-earth element (such as La) serving as a donor, and B includes Ti. The semiconductor ceramic material contains 2 to 20 molar parts, and preferably 12.5 to 17.5 molar parts, of Ca per 100 molar parts of Ti.

In general, Ca is sometimes added to $BaTiO_3$ semiconductor ceramic materials such that PTC thermistors formed therewith have increased withstand voltage. This is because the addition of Ca allows fine grains to be formed and results in an increase in withstand voltage. In other words, the addition of Ca allows fine grains to be formed and therefore is likely to result in an increase in electrical resistivity. Hence, the advantage that the addition of Ca results in a reduction in withstand voltage is not usually available.

When the composition of the semiconductor ceramic material according to the present invention is (Ba, Na, Bi, Ln)TiO$_3$ (where Na may be replaced with another alkali metal element and Ln is a rare-earth element), the grains therein are fine. It has been found that the addition of Ca to the semiconductor ceramic material allows the grains to grow (see experiments below).

Semiconductor ceramic materials having PTC characteristics have low resistance because grain boundary barriers are reduced due to spontaneous polarization in the ceramic crystal grains. It has been found that the tetragonalinity of a crystal is increased, that is, the axial ratio (c/a axial ratio) of the crystal is increased in such a manner that Ba is partly replaced with Ca in accordance with the present invention. From this result, it can be inferred that an increase in spontaneous polarization reduces the grain boundary barriers to cause a reduction in resistance.

In the semiconductor ceramic material according to the present invention, the content of the alkali metal element, the content of Bi, and the content of the rare-earth element, which serves as a donor, are preferably selected such that a ratio of the content of the alkali metal element to the sum of the content of the bismuth plus the content of the rare earth element, is from 1.00 to 1.06. This range provides a good carrier balance and high rate of change in resistance and can improve PTC characteristics.

The semiconductor ceramic material according to the present invention preferably further contains 0.01 to 0.2 molar parts of Mn, which serves as an acceptor, per 100 molar parts of Ti. The addition of Mn allows acceptor to be formed at grain boundaries and allows an increase in the rate of change in resistance and an improvement in PTC characteristics.

SiO$_2$ is likely to react with Bi and Na to produce a glass component. Therefore, even if, for example, a major component is calcined and a mixture of the major component and SiO$_2$ is then fired, Na and Bi that remain without being reacted during calcination are readily used to obtain a glass during firing. This can result in a shift in the composition of the composition to cause an increase in resistance. Therefore, the content of SiO$_2$ is preferably 0.2 molar parts or less per 100 molar parts of Ti.

Experiments performed to determine the scope of the present invention and to confirm advantages of the present invention will now be described.

EXPERIMENT 1

The following powders were weighed and compounded such that compositions shown in Table 1 were obtained after firing: powders of BaCO$_3$, CaCO$_3$, Na$_2$CO$_3$, Bi$_2$O$_3$, TiO$_2$, and La$_2$O$_3$ (a semiconducting agent) that were raw materials.

Each compounded powder mixture was mixed with an ethanol-based solvent for 24 hours using zirconia balls, dried by removing the solvent, and then screened with a #50-mesh sieve. The screened powder mixture was heat-treated at a temperature of 800° C. to 1000° C. for two hours, whereby a calcined powder was obtained.

The calcined powder was mixed with vinyl acetate, which was used as an organic binder, poly(ammonium carboxylate), which was used as a dispersant, and water for 16 hours using zirconia balls. The slurry thereby obtained was dried and then screened with a #50-mesh sieve, whereby a source material for pressing was obtained.

The source material was formed into a disk shape at a pressure of 1000 kgf/cm$^2$ using a single-shaft press, whereby a disk sample was obtained. The disk sample was debinded in air and then fired at a top temperature of 1250° C. to 1400° C. for two hours in a nitrogen atmosphere. This allowed the disk sample to have a diameter of 12 mm and a thickness of 2 mm. The compositions shown in Table 1 were determined by inductively coupled plasma atomic emission spectrometry (ICP-AES) analysis.

Both principal surfaces of the disk sample fired as described above were polished with a piece of sandpaper. Ni/Ni—Cu alloy/Ag electrodes were formed on the polished principal surfaces thereof by dry plating, whereby an evaluation sample was obtained. The evaluation sample was evaluated for the properties reported in Table 1.

The "electrical resistivity" of the evaluation sample was determined as follows: a direct-current voltage of 0.1 V was applied to the evaluation sample at room temperature (25° C.), the room-temperature resistance of the evaluation sample was measured by a direct current four-terminal method, and the room-temperature resistance per unit length of the evaluation sample was calculated, whereby the electrical resistivity thereof was obtained.

The "PTC digit" of the evaluation sample was determined in such a manner that the evaluation sample was measured for resistance at 25° C. and 250° C. by the same method as that used to measure the room-temperature resistance thereof and the rate of change in resistance determined by the equation $\Delta R = \log(R_{250}/R_{25})$ was used to express the "PTC digit" thereof, wherein $\Delta R$ represents the rate of change in resistance of the evaluation sample, $R_{25}$ represents the resistance of the evaluation sample at 25° C., and $R_{250}$ represents the resistance thereof at 250° C.

The "Tc (Curie point)" of the evaluation sample was defined to be the temperature at which the electrical resistivity of the evaluation sample doubled.

TABLE 1

| | Compositions (molar parts per 100 molar parts of Ti) | | | | | Properties | | |
|---|---|---|---|---|---|---|---|---|
| | | | | | | Electrical resistivity | PTC | Tc |
| Samples | Ba | Ca | Na | Bi | La | ($\Omega \cdot$ cm) | digit | (° C.) |
| 1 | 89.9 | 0 | 5.0 | 4.9 | 0.2 | 42 | 3.0 | 179 |
| 2 | 88.0 | 1.9 | 5.0 | 4.9 | 0.2 | 40 | 3.1 | 179 |
| 3 | 85.6 | 4.3 | 5.0 | 4.9 | 0.2 | 33 | 3.1 | 178 |
| 4 | 84.9 | 5.0 | 5.0 | 4.9 | 0.2 | 15 | 3.7 | 172 |
| 5 | 80.0 | 9.9 | 5.0 | 4.9 | 0.2 | 14 | 3.6 | 169 |
| 6 | 77.4 | 12.5 | 5.0 | 4.9 | 0.2 | 12 | 3.7 | 169 |
| 7 | 74.9 | 15.0 | 5.0 | 4.9 | 0.2 | 11 | 3.4 | 159 |
| 8 | 72.4 | 17.5 | 5.0 | 4.9 | 0.2 | 12 | 3.3 | 158 |
| 9 | 69.9 | 20.0 | 5.0 | 4.9 | 0.2 | 24 | 3.4 | 150 |
| 10 | 67.4 | 22.5 | 5.0 | 4.9 | 0.2 | 38 | 3.0 | 152 |
| 11 | 64.9 | 25.0 | 5.0 | 4.9 | 0.2 | 96 | 2.5 | 168 |
| 12 | 59.9 | 30.0 | 5.0 | 4.9 | 0.2 | 378 | 1.6 | 160 |

As is clear from Table 1, Samples 4 to 9, in which the content of Ca ranges from 5 to 20 molar parts per 100 molar parts of Ti, have a high Curie point of 150° C. or higher and an electrical resistivity of 30 $\Omega$·cm or less. Samples 6 to 8, in which the content of Ca is within the limited range from 12.5 to 17.5 molar parts, have a particularly low electrical resistivity.

In contrast, Samples 1 to 3, in which the content of Ca is less than 5 molar parts, and Samples 10 to 12, in which the content of Ca is greater than 20 molar parts, have an electrical resistivity of greater than 30 Ω·cm.

The reason why Samples 4 to 9, which are within the scope of the present invention, have low electrical resistivity can be inferred as described below.

FIG. 1 shows the relationship between the content of Ca in each ceramic crystal, the length of the a-axis and c-axis of the ceramic crystal, and the axial ratio (c/a axial ratio) of the ceramic crystal, the a-axis and c-axis thereof being determined by X-ray diffraction (XRD). With reference to FIG. 1, an increase in the content of Ca tends to increase the c/a axial ratio. This suggests that the ceramic crystal has strong ferroelectricity. Therefore, this advantageously acts on semiconductor ceramic materials having such PTC characteristics such that spontaneous polarization causes a reduction in resistance; hence, the presence of Ca and an increase in the content thereof probably result in a reduction in resistance. The reason why a Ca content exceeding 20 molar parts causes an increase in electrical resistivity as shown in Table 1 is probably that this content exceeds the solubility limit of Ca.

FIGS. 2A, 2B, 2C, and 2D are illustrations prepared by tracing grain boundaries of ceramic crystals in SEM images of chemically etched surfaces of sintered bodies obtained from Samples 1, 4, 9, and 11, which have a Ca content of zero, 5, 20, and 25 molar parts, respectively.

The figures illustrate that the increase of the content of Ca from 5 molar parts to 20 molar parts allows the ceramic crystals to have a large grain size because of the growth of grains of the ceramic crystals. This suggests that the number of grain boundaries per unit thickness of a sintered body can be reduced by selecting the content of Ca within a range from 5 to 20 molar parts and this leads to a reduction in resistance.

Figure 2A:
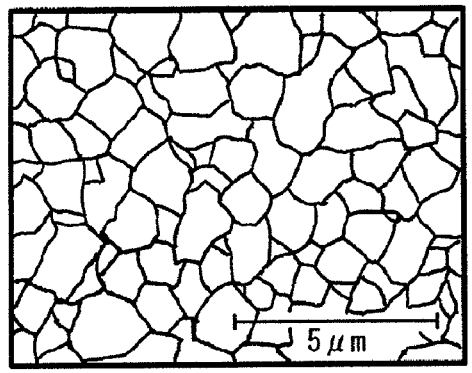
FIGS. 2A to 2D includes illustrations prepared by tracing grain boundaries of ceramic crystals in SEM images of chemically etched surfaces of samples of sintered bodies obtained in Example 1.
Figure 2B:
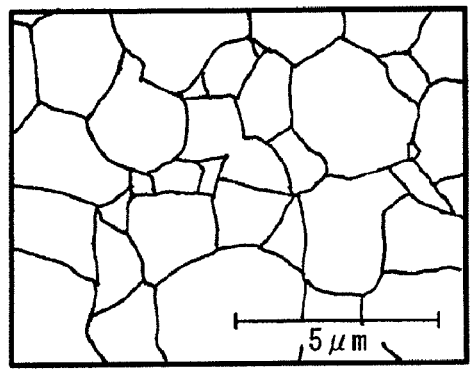
Figure 2C:
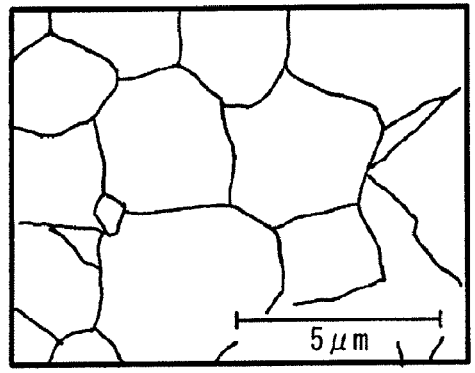
Figure 2D:
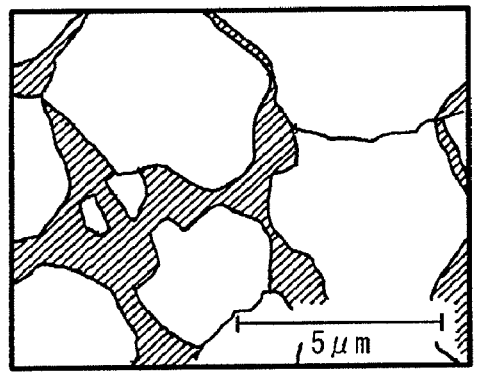

The sample shown in FIG. 2D, having a Ca content of 25 molar parts contains a small number of grown grains, and white heterophases (indicated by hatched portions in this figure) are present at boundaries between these grains. This suggests that Ca precipitates at grain boundaries of the ceramic crystals and this results in an increase in electrical resistivity.

EXPERIMENT 2

Evaluation samples were prepared and then evaluated in substantially the same manner as that described in Experiment 1 except that a $Mn_3O_4$ powder was prepared and then added to the above-mentioned calcined powders such that compositions shown in Table 2 were obtained after firing.

TABLE 2

| | Compositions (molar parts per 100 molar parts of Ti) | | | | | | Properties | | |
|---|---|---|---|---|---|---|---|---|---|
| Samples | Ba | Ca | Na | Bi | La | Mn | Electrical resistivity (Ω·cm) | PTC digit | Tc (° C.) |
| 21 | 74.8 | 15.0 | 5.0 | 5.0 | 0.2 | 0 | 11 | 3.3 | 159 |
| 22 | 74.8 | 15.0 | 5.0 | 5.0 | 0.2 | 0.001 | 13 | 3.4 | 158 |
| 23 | 74.8 | 15.0 | 5.0 | 5.0 | 0.2 | 0.01 | 15 | 4.2 | 156 |
| 24 | 74.8 | 15.0 | 5.0 | 5.0 | 0.2 | 0.1 | 21 | 4.6 | 155 |
| 25 | 74.8 | 15.0 | 5.0 | 5.0 | 0.2 | 0.2 | 25 | 5.3 | 150 |
| 26 | 74.8 | 15.0 | 5.0 | 5.0 | 0.2 | 0.5 | 29 | 5.0 | 139 |

Table 2 illustrates that although the addition of Mn tends to cause a slight increase in electrical resistivity, Samples 23 to 25, in which the content of Mn is 0.01 to 0.2 molar parts per 100 molar parts of Ti, are not significantly increased in electrical resistivity and the PTC digit thereof can be increased to 4.0 or more without significantly reducing the Tc (Curie point) thereof. The increase of the PTC digit thereof is probably due to the fact that the addition of a predetermined amount of Mn allowed acceptor to be present at grain boundaries of ceramic crystals.

EXPERIMENT 3

Evaluation samples were prepared and then evaluated in substantially the same manner as that described in Experiment 1 except that the ratio "Na/(Bi+La)" was varied in fired compositions as shown in Table 3.

TABLE 3

| | Compositions (molar parts per 100 molar parts of Ti) | | | | | Na/ (Bi + La) | Properties | | |
|---|---|---|---|---|---|---|---|---|---|
| Samples | Ba | Ca | Na | Bi | La | | Electrical resistivity (Ω·cm) | PTC digit | Tc (° C.) |
| 31 | 74.8 | 15.0 | 5.0 | 5.0 | 0.2 | 0.96154 | 11 | 3.3 | 159 |
| 32 | 74.9 | 15.0 | 5.0 | 4.9 | 0.2 | 0.98039 | 8 | 3.4 | 158 |
| 33 | 74.8 | 15.0 | 5.1 | 4.9 | 0.2 | 1.00000 | 15 | 4.2 | 156 |
| 34 | 74.7 | 15.0 | 5.2 | 4.9 | 0.2 | 1.01961 | 21 | 4.6 | 155 |
| 35 | 74.8 | 15.0 | 5.2 | 4.8 | 0.2 | 1.04000 | 22 | 5.3 | 155 |
| 36 | 74.7 | 15.0 | 5.3 | 4.8 | 0.2 | 1.06000 | 24 | 4.4 | 154 |
| 37 | 74.8 | 15.0 | 5.3 | 4.7 | 0.2 | 1.08163 | 26 | 2.1 | 158 |

As shown in Table 3, Samples 33 to 36, in which the ratio "Na/(Bi+La)" is within a range from 1.0 to 1.06, have a larger PTC digit and can be improved in PTC characteristics as compared to Samples 31, 32, and 37, in which the ratio "Na/(Bi+La)" is outside this range.

EXPERIMENT 4

Evaluation samples were prepared and then evaluated in substantially the same manner as that described in Experiment 1 except that a $SiO_2$ powder were prepared and then added to the above-mentioned calcined powders such that compositions shown in Table 4 were obtained after firing.

TABLE 4

| | Compositions (molar parts per 100 molar parts of Ti) | | | | | | Properties | | |
|---|---|---|---|---|---|---|---|---|---|
| Samples | Ba | Ca | Na | Bi | La | $SiO_2$ | Electrical resistivity (Ω·cm) | PTC digit | Tc (° C.) |
| 56 | 74.8 | 15.0 | 5.0 | 5.0 | 0.2 | 0 | 11 | 3.4 | 159 |
| 57 | 74.8 | 15.0 | 5.0 | 5.0 | 0.2 | 0.001 | 11 | 3.0 | 162 |
| 58 | 74.8 | 15.0 | 5.0 | 5.0 | 0.2 | 0.003 | 14 | 3.3 | 160 |
| 59 | 74.8 | 15.0 | 5.0 | 5.0 | 0.2 | 0.01 | 16 | 3.5 | 158 |
| 60 | 74.8 | 15.0 | 5.0 | 5.0 | 0.2 | 0.03 | 17 | 3.4 | 154 |
| 61 | 74.8 | 5.0 | 5.0 | 5.0 | 0.2 | 0.1 | 20 | 3.1 | 156 |
| 62 | 74.8 | 6.0 | 5.0 | 5.0 | 0.2 | 0.2 | 28 | 4.1 | 150 |
| 63 | 71.2 | 5.0 | 5.0 | 5.0 | 0.2 | 0.3 | 42 | 2.9 | 147 |

Table 4 illustrates that Samples 56 to 62, in which the content of $SiO_2$ is zero molar parts or 0.2 molar parts or less per 100 molar parts of Ti, have low electrical resistivity, a large PTC digit, and a high Tc. However, Sample 63, in which the content of $SiO_2$ is 0.3 molar parts per 100 molar parts of Ti, has high electrical resistivity and a small PTC digit.

The invention claimed is:

1. A semiconductor ceramic material represented by the formula $ABO_3$ and which has a positive temperature coefficient, wherein A comprises Ba, Ca, an alkali metal element, Bi, and a rare-earth element, and B comprises Ti, in which the semiconductor ceramic material contains 5 to 20 molar parts of Ca per 100 molar parts of Ti.

2. The semiconductor ceramic material according to claim 1, wherein the content of Ca is 12.5 to 17.5 molar parts per 100 molar parts of Ti.

3. The semiconductor ceramic material according to claim 2, further containing 0.01 to 0.2 molar parts of Mn per 100 molar parts of Ti.

4. The semiconductor ceramic material according to claim 3, further containing up to 0.2 molar parts of $SiO_2$ per 100 molar parts of Ti.

5. The semiconductor ceramic material according to claim 4, wherein the alkali metal comprises Na.

6. The semiconductor ceramic material according to claim 5, wherein the rare earth metal comprises La.

7. The semiconductor ceramic material according to claim 6, wherein the content of alkali metal element, Bi, and rare-earth element are such that the ratio of the content of the alkali metal element to the sum of the content of the bismuth plus the content of the rare earth element is from 1.00 to 1.06.

8. The semiconductor ceramic material according to claim 1, further containing up to 0.2 molar parts of $SiO_2$ per 100 molar parts of Ti.

9. The semiconductor ceramic material according to claim 8, wherein the alkali metal comprises Na.

10. The semiconductor ceramic material according to claim 9, wherein the rare earth metal comprises La.

11. The semiconductor ceramic material according to claim 10, wherein the content of alkali metal element, Bi, and rare-earth element are such that the ratio of the content of the alkali metal element to the sum of the content of the bismuth plus the content of the rare earth element is from 1.00 to 1.06.

12. The semiconductor ceramic material according to claim 1, wherein the rare earth metal comprises La.

13. The semiconductor ceramic material according to claim 12, wherein the content of alkali metal element, Bi, and rare-earth element are such that the ratio of the content of the alkali metal element to the sum of the content of the bismuth plus the content of the rare earth element is from 1.00 to 1.06.

14. The semiconductor ceramic material according to claim 1, wherein the content of alkali metal element, Bi, and rare-earth element are such that the ratio of the content of the alkali metal element to the sum of the content of the bismuth plus the content of the rare earth element is from 1.00 to 1.06.

* * * * *